United States Patent [19]

Hofmann et al.

[11] Patent Number: 4,611,933
[45] Date of Patent: Sep. 16, 1986

[54] FASTENING OF ANTI-FRICTION BEARINGS

[75] Inventors: Heinrich Hofmann, Schweinfurt; Horst Ulsenheimer, Dittelbrunn, both of Fed. Rep. of Germany

[73] Assignee: FAG Kugelfischer Georg Schafter (KGaA), Fed. Rep. of Germany

[21] Appl. No.: 722,676

[22] Filed: Apr. 12, 1985

Related U.S. Application Data

[63] Continuation of Ser. No. 485,032, Apr. 14, 1983, abandoned.

[30] Foreign Application Priority Data

May 6, 1982 [DE] Fed. Rep. of Germany ....... 3216958

[51] Int. Cl.⁴ ........................................... F16C 43/04
[52] U.S. Cl. ................................... 384/512; 384/458; 384/536; 384/537; 384/585
[58] Field of Search ............... 384/512, 458, 536, 538, 384/537, 585

[56] References Cited

U.S. PATENT DOCUMENTS 2,257,401  9/1941  Schwinn .
2,779,641  1/1957  Sutowski .
3,396,554  8/1968  Westercamp .
3,451,736  6/1969  Riccio .
4,229,055  10/1980  Olschewski et al. .

Primary Examiner—Lenard A. Footland
Attorney, Agent, or Firm—Ostrolenk, Faber, Gerb & Soffen

[57] ABSTRACT

The disclosure concerns accurate axial and radial fastening of the bearings of, for instance, a bicycle pedal crank. An intermediate sleeve of deformable material is arranged between the outer race of the bearing on the shaft and the housing for the pedal crank. There is underdimensioning between the intermediate sleeve and the outer race, on the one hand, and the housing borehole on the other hand, and the outer race having teeth.

25 Claims, 6 Drawing Figures

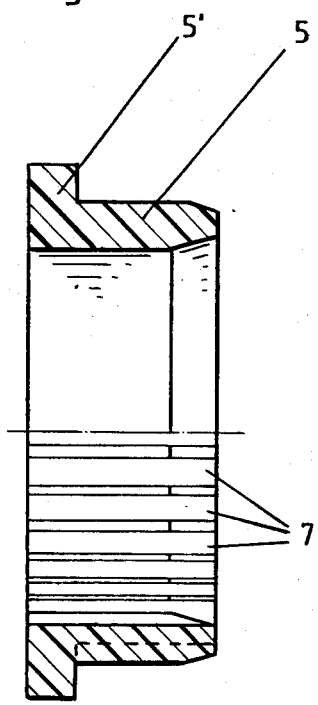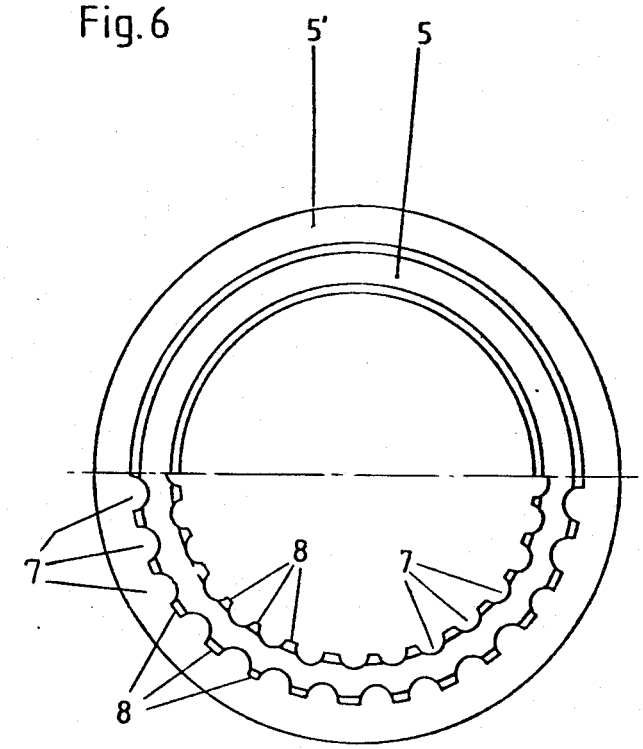

FASTENING OF ANTI-FRICTION BEARINGS

RELATED APPLICATIONS

This is a continuation of application Ser. No. 485,032 filed Apr. 14, 1983, now abandoned.

BACKGROUND OF THE INVENTION

The present invention relates to the fastening of anti-friction bearings, particularly for fastening a housing to a shaft. One type of housing to be fastened to a shaft is the housing of a bicycle pedal crank. But, this environment of the invention is merely exemplary.

Fastening devices for anti-friction bearings, used on bicycle pedal brackets, for example, are known from German Published Application No. OS. 30 24 546. In that case, simple axial fastening is obtained with the use of locking disks which are seated on a rough section on the outer race of the anti-friction bearing, and the disks come against the front side of the frame bushing. This arrangement has the disadvantage that the borehole of the frame bushing must be very accurately machined for precise radial installation of the bearing.

SUMMARY OF THE INVENTION

The object of the present invention is to improve the aforementioned type of fastening device so that the above-mentioned disadvantages are avoided and so that precise axial and radial fastening of the bearing or bearings is obtained by simple means, even if the housing or frame is only partially machined or is not machined at all. The anti-friction bearing of the invention is for fastening a housing, such as a bicycle pedal crank, to a shaft. The bearing for this purpose includes the shaft which defines the inner race for the bearing elements. The rolling elements are usually balls. The inner race on the shaft holds the bearing elements axially and defines their rotary pathway. An outer race is located radially outside the inner race, and the bearing elements are supported between the outer and inner races. The housing of the pedal crank is located radially outside the outer race.

An intermediate sleeve comprised of deformable material, such as plastic, is disposed in the space inside the housing and outside the outer race. Withdrawal prevention means act on the sleeve for preventing the sleeve from moving out from between the outer race and the housing. In one version, the withdrawal prevention means are provided between the outer race and the intermediate sleeve. In the alternative, the withdrawal prevention means may be provided between the housing and the intermediate sleeve. The withdrawal prevention means comprise teeth defined on one of the elements cooperating with the intermediate sleeve, i.e. on the exterior surface of the outer race.

The teeth cooperate with the radially adjacent deformable sleeve for holding the two of them together, thereby preventing the sleeve from being withdrawn. Particularly when teeth are involved, the housing is underdimensioned with respect to the sleeve and the sleeve, in turn, is underdimensioned with respect to the outer race, so that the sleeve is pressed radially against the outer race and the teeth are pressed securely into the cooperating element of the bearing, so that this serves to prevent the withdrawal of the intermediate sleeve from between the housing and the outer race.

As already shown in German Application No. OS 30 24 546, axial fixing of the bearings and of their distance apart over the shaft is effected by developing the bearing raceways in the shaft itself. This preassemblable unit, consisting of two rows of bearings, which are practically without play both axially and radially, must then be installed on a shaft in the housing, of the pedal, for example. This is done by forcing the intermediate sleeve of the invention, with initial radial stress, between the jacket or exterior surface of the outer race and the roughly machined housing, at least on one axial side of the shaft. Later migration or ejection of the intermediate sleeve is prevented by the presence of teeth on the outer race, that the intermediate sleeve and the outer race cooperate. In this way, simple means make simple mounting of the bearing possible. Since the intermediate sleeve is comprised of deformable material, it can be installed even into an inaccurately machined housing borehole without the operability or life of the bearing negatively affected. Possible machining is furthermore only necessary in the regions in which the intermediate sleeve is arranged. Complete and therefore extensive boring of the whole housing is not necessary.

Outer races of anti-friction bearings with teeth are, it is true, known from U.S. Pat. No. 2,779,617. But, only a part of the problems indicated here are solved merely by toothed bearings. The teeth of the invention are not symmetric. The sleeve is installed from one side of the housing. That flank of the tooth, which is on the axial side facing away from the side from which the sleeve is installed, is oriented generally perpendicular to the axis of the shaft. Therefore, once the sleeve has been installed, the orientation of the teeth will prevent subsequent extraction of the sleeve from between the housing and the inner race.

With such a shape and direction of the teeth, easier and more reliable fixing of the intermediate sleeve is obtained than with symmetrical teeth. The sleeve can be inserted easily in one direction without damaging the balls or bearing elements and the sleeve compensates for axial tolerances while reliable positioning is obtained rearward. The outer race has face sides, which are its axially spaced apart opposite sides. In one embodiment, the teeth are defined only in the region of the opposite face sides of the outer race.

In view of certain inaccuracies in the position of the two anti-friction bearing receiving places in the housing, it is advisable to provide the teeth only in the region of the two face sides of the outer race. In this way, a certain adjustability of angle is obtained in that the teeth dig into the deformable sleeve to different depths.

The problem here is also solved if, instead of using high-shoulder ball bearings, a double-row self-aligning ball bearing is used, at least on one side.

In order that the intermediate sleeve always assumes a specific axial position in the smooth housing and not be able to be inserted inward, as seen in partial cross section, the sleeves in one embodiment have a generally L-shaped profile, with their radial arm resting preferably against the front surface of the housing in the installed condition. As an alternative to shaping the intermediate sleeve with a generally L-shaped profile, the housing has a shoulder defined in it and as the intermediate sleeve is installed between the housing and the outer race, it eventually abuts the shoulder which prevents further insertion and positions the intermediate sleeve.

It is also possible to provide the intermediate sleeve, at least over a region of about 180° and at least on the jacket or outward side, with recesses that are preferably axially directed. In this way, radial tolerance problems are further reduced. This effect is increased if the recesses in the sleeve jacket and the borehole region or inward side of the housing are so staggered with respect to each other as to result in a meander-like shape.

The invention will be explained in further detail on the basis of an illustrative example.

BRIEF DESCRIPTION OF THE DRAWINGS

FIG. 5 shows a longitudinal section through a different intermediate sleeve; and FIG. 6 is a cross-section of the sleeves of FIG. 5.

DESCRIPTION OF THE PREFERRED EMBODIMENTS

Figure 1:
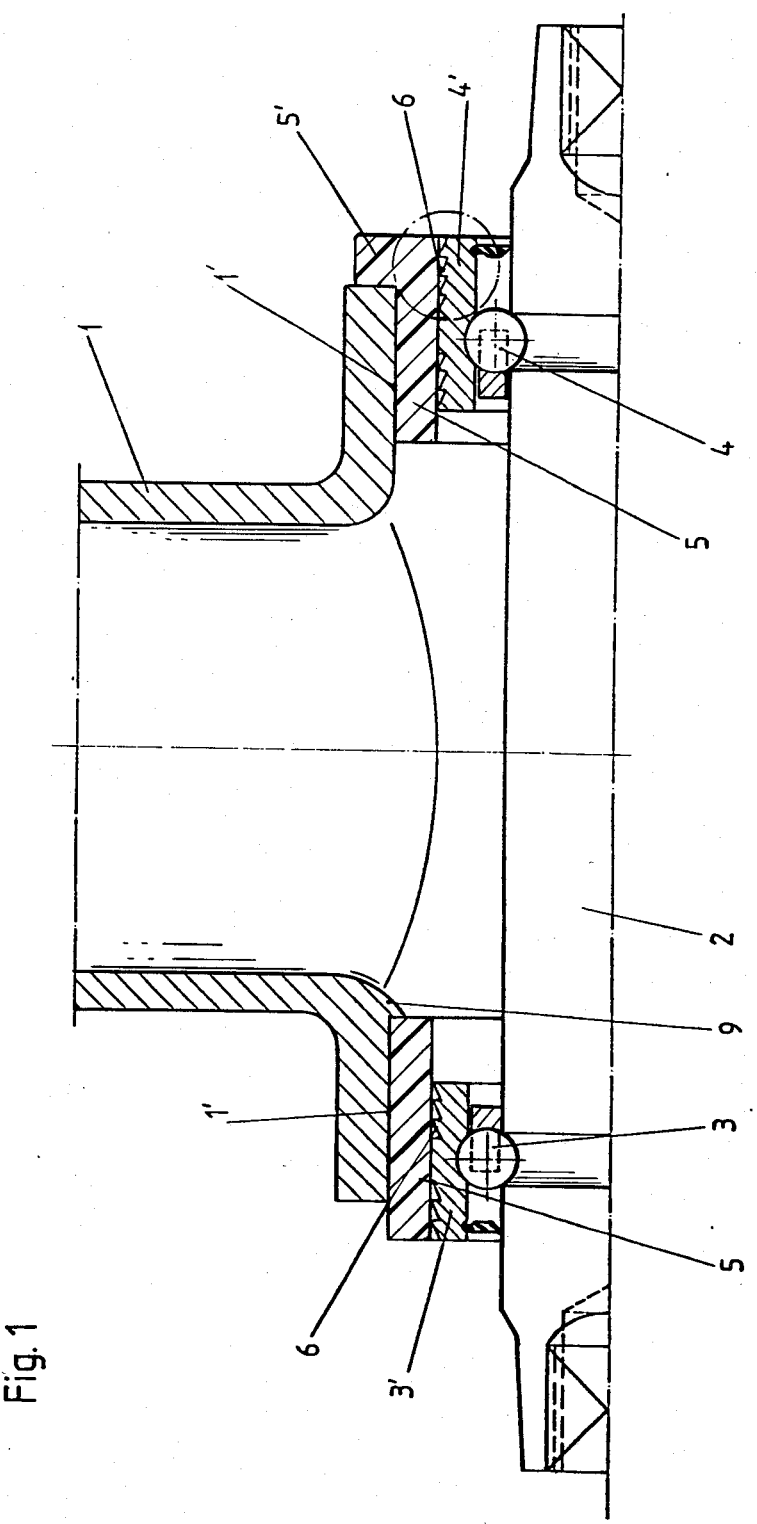
FIG. 1 is a partial cross-section through the pedal bracket of a bicycle, which is provided with the invention.

As shown in FIG. 1, the pedal bracket of a bicycle is arranged in the frame or housing 1. It includes a shaft 2. On both sides, there are ball bearings 3 and 4 having high shoulders on both sides for transmission of forces in both axial directions. The inner races of these ball bearings are developed directly in the shaft 2. Between the outer races 3' and 4' and the boreholes 1' of the frame or housing 1, there is positioned an intermediate sleeve 5 comprised of a deformable material, for instance plastic. To define a usable fastening of the sleeves, an underdimensioning is provided between the intermediate sleeves 5 and the outer races 3' and 4' as well as the housing boreholes 1'. In order to prevent the intermediate sleeves 5 from moving away axially, the external surfaces of the outer races 3' and 4' have teeth 6 which dig into the sleeve due to the above-mentioned underdimensioning. While teeth are shown on the external or jacket surfaces of the outer races, the teeth may alternatively or additionally be defined on the bore hole or interior surfaces 1'. However, since the outer races are more securely held axially on the shaft 2, placement of the teeth on the outer races is preferable.

Figure 2:
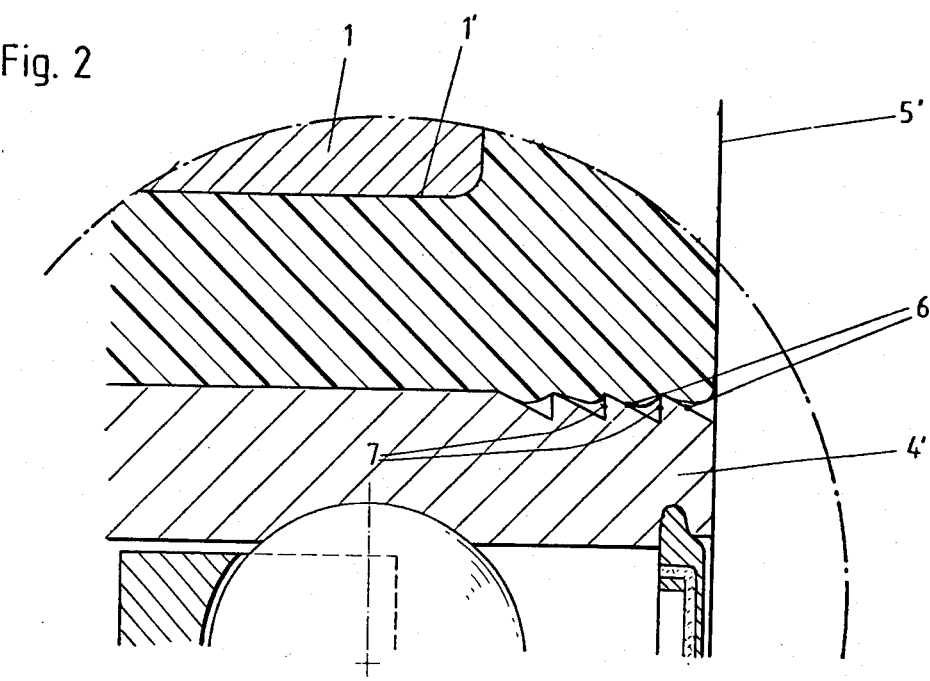
FIG. 2 shows a portion of FIG. 1 on a larger scale.

The axial fastening is further increased by the fact that the teeth have vertical flanks 7 on one side, as shown in particular in FIG. 2. It is also of importance that the axial fixing of the anti-friction bearings 3 and 4 is effected via the shaft 2 since the inner races are developed directly in the shaft. A good mounting is particularly obtained when these bearings have neither axial nor radial play.

In the mounting of the housing of the pedal crank, the two anti-friction bearings 3 and 4 are first arranged on the shaft 2. Next, the structural unit resulting from the use of special cages is introduced into the housing 1. Thereupon the intermediate sleeves 5 are pressed in, first from the one side and then from the other. In order that the intermediate sleeves 5 assume the desired position without great expense, they are preferably developed with an L-shaped cross-section, as shown in the right-hand side of FIG. 1. The pressing-in of the intermediate sleeves 5 is therefore halted when their arms 5' come against the axial front surfaces of the frame 1. The left-hand side of Fig. 1 shows an embodiment that performs similarly, but is of different construction. In this case, the borehole 1' of the frame 1 has a shoulder 9 against which the intermediate sleeve 5 is applied axially.

The means shown there enable simple attachment of the anti-friction bearings 3 and 4 within the frame 1 of a bicycle pedal bracket, even if the frame 1 is not precisely machined. By means of the deformable intermediate sleeve 5, any inaccuracies in the radial or axial directions are compensated for.

Figure 3:
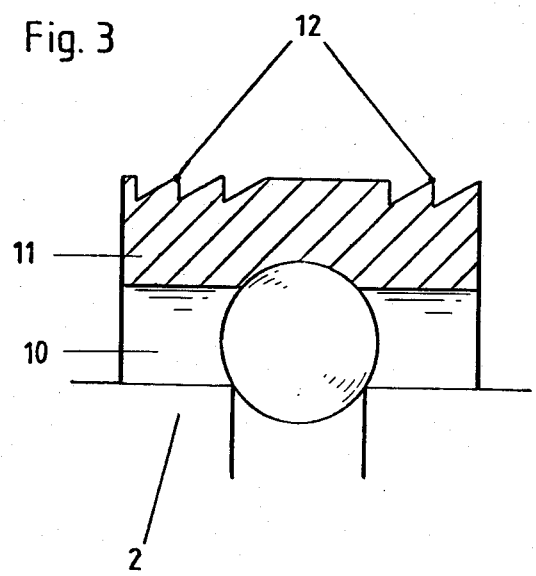
FIG. 3 is a partial cross-section through a single row grooved ball bearing with different arrangement of teeth.
Figure 4:
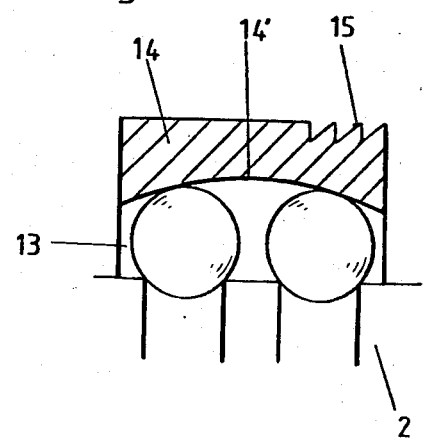
FIG. 4 shows a partial cross-section through a double-row self-aligning roller bearing that is a variant of FIG. 3.

In particular, in the case of non-aligned bearing-seat positions, in order to make an adjustment possible, the embodiments of FIGS. 3 or 4 can be used. In the case of a high-shoulder ball bearing 10 in accordance with FIG. 3, such adjustment in the bearing is not possible. Therefore, in this case the teeth 12 are seated on the outer race 11 in the region of its two face sides. In this way, the teeth 12 can dig to different depths into the intermediate sleeve (not shown), whereby a certain possibility of adjustment of the angle is made possible.

This same result can also be obtained by the use of a double-row self-aligning ball bearing 13, in accordance with FIG. 4. The adjustment movement takes place here in the spherical surfaces 14' of the outer race 14. The teeth 15 are in this case, of course, required only on one side.

In order to further reduce the effect of radial inaccuracies, an intermediate bushing, such as that shown in FIGS. 5 and 6, may also be used. In this case, the intermediate sleeve 5 has axially directed recesses 7 over a region of about 180° on both of external or its jacket and or internal borehole sides. The recesses on these two sides are so staggered with respect to each other that recesses 7 on the one side are opposite elevations on the other side. This development of the intermediate sleeve adapts it even better to inaccuracies in manufacture. Upon installation, the region of the intermediate sleeve that is not provided with recesses is then preferably arranged in the load zone. In this way, there is assurance that when placed under load, a certain small elastic deformation will not be exceeded.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

What is claimed is:

1. An anti-friction bearing for fastening a housing to a shaft, the bearing comprising:

the shaft having defined in it an inner race for bearing elements for axially holding the bearing elements;

an outer race radially outside the inner race;

bearing elements supported between the inner and outer races on the shaft;

the housing being radially outside the outer race and spaced therefrom; and an intermediate sleeve of deformable material disposed between the housing and the outer race, at least one of the housing and the outer race having withdrawal prevention means thereon between the sleeve and said at least one of the housing and the outer race for preventing the sleeve from being withdrawn from between the outer race and the housing;

the intermediate sleeve having a generally L-shaped profile in cross-section.

2. The bearing of claim 1, wherein the withdrawal prevention means comprises teeth defined on at least one of the housing and the outer race, and the teeth being adapted to cooperate between the intermediate sleeve and the other of the housing and the outer race for preventing withdrawal of the sleeve from between the housing and the outer race.

3. The bearing of claim 2, wherein the housing is under-dimensioned with respect to the intermediate sleeve and the sleeve, in turn, is under-dimensioned with respect to the outer race so that the sleeve is pressed radially against the outer race and this serves as part of the withdrawal prevention means.

4. The bearing of claim 3, wherein one leg of the L-shaped profile of the intermediate sleeve is inserted between the outer race and the housing and is moved therebetween upon insertion until the other leg of the L contacts the housing for blocking further insertion of the intermediate sleeve between the housing and the outer race.

5. An anti-friction bearing for fastening a housing to a shaft, the bearing comprising:
the shaft having defined in it an inner race for bearing elements for axially holding the bearing elements;
an outer race radially outside the inner race;
bearing elements supported between the inner and outer races on the shaft;
the housing being radially outside the outer race and spaced therefrom; and
an intermediate sleeve of deformable material disposed between the housing and the outer race; at least one of the housing and the outer race having withdrawal prevention means thereon between the outer race and the intermediate sleeve for preventing the sleeve from separating from between the outer race and the housing;
the intermediate sleeve having a generally L-shaped profile in cross-section.

6. In combination, two of the anti-friction bearings of claim 5; the shaft carrying two of the inner races at axially spaced apart locations along the shaft which defines the locations of the two bearings; the housing being radially outside the outer races of both of the bearings; a respective one of the intermediate sleeves being provided for each of the bearings.

7. The bearing of claim 5, wherein the intermediate sleeve has an interior surface and the outer race has an exterior surface which cooperates with the interior surface of the intermediate sleeve; the withdrawal prevention means comprises teeth defined on the cooperating exterior surface of the outer race.

8. The bearing of claim 7, wherein the intermediate sleeve has an array of generally axially oriented, circumferentially spaced apart recesses on its exterior surface, and the recesses are arrayed circumferentially at least about 180° around the sleeve.

9. The bearing of claim 5, wherein the housing has a shoulder defined at its interior surface, and the shoulder is directed and placed for being engaged by the intermediate sleeve as the sleeve is inserted between the housing and the outer race, and the shoulder thereby defines the extent to which the sleeve is inserted between the housing and the outer race.

10. The bearing of claim 5, wherein the housing is underdimensioned with respect to the intermediate sleeve and the intermediate sleeve, in turn, is underdimensioned with respect to the outer race, so that the sleeve is pressed radially against the outer race, and this serves as part of the withdrawal prevention means.

11. The bearing of claim 10, wherein one leg of the L-shaped profile of the intermediate sleeve is inserted between the outer race and the housing and is moved therebetween upon insertion until the other leg of the L-contacts the housing for blocking further insertion of the intermediate sleeve between the housing and the outer race.

12. The bearing of claim 10, wherein the intermediate sleeve has an array of generally axially oriented, circumferentially spaced apart recesses on its exterior surface, and the recesses are arrayed circumferentially at least about 180° around the sleeve.

13. The bearing of claim 12, wherein the recesses are defined both on the internal surface of the sleeve, which engages the outer race, and the external surface of the sleeve, which engages the interior surface of the housing, and the recesses on the interior and exterior surfaces of the sleeve are staggered around the sleeve, whereby a recess on one surface is opposite an elevation on the other surface of the sleeve.

14. The bearing of claim 10, wherein the bearing elements are roller bearings.

15. The bearing of claim 14, wherein the bearing elements are double row, self-aligning roller bearings.

16. The bearing of claim 10, wherein the intermediate sleeve has an exterior surface and the housing has an interior surface which cooperates with the exterior surface of the intermediate sleeve; the withdrawal prevention means comprises teeth defined on the cooperating exterior surface of the outer race.

17. The bearing of claim 16, wherein the teeth each have a first flank facing toward the axial side of the housing from which the sleeve is installed, and the teeth each have a second flank facing away from that side of the housing; the second flank of the teeth being perpendicular to the axis of the bearing, giving the teeth a shape which prevents withdrawal of the intermediate sleeve from between the housing and the outer race.

18. The bearing of claim 16, wherein the outer race has axial face sides thereof along the shaft, and the teeth are defined only in the region of the two face sides of the outer race.

19. The bearing of claim 16, wherein the teeth are defined on the outer race for engaging the intermediate sleeve.

20. The bearing of claim 16, wherein the intermediate sleeve has an array of generally axially oriented, circumferentially spaced apart recesses on its exterior surface, and the recesses are arrayed circumferentially at least about 180° around the sleeve.

21. The bearing of claim 20, wherein the recesses are defined both on the internal surface of the sleeve, which engages the outer race, and the external surface of the sleeve, which engages the interior surface of the housing, and the recesses on the interior and exterior surfaces of the sleeve are staggered around the sleeve, whereby a recess on one surface of the sleeve is opposite an elevation on the other surface of the sleeve.

22. The bearing of claim 16, wherein the bearing elements are roller bearings.

23. The bearing of claim 22, wherein the bearing elements are double row, self-aligning roller bearings.

24. In combination, two of the anti-friction bearings of claim 16; the shaft carrying two of the inner races at axially spaced apart locations along the shaft which defines the locations of the two bearings; the housing being radially outside the outer races of both of the bearings; a respective one of the intermediate sleeves being provided for each of the bearings.

25. An anti-friction bearing for fastening a housing to a shaft, the bearing comprising:

the shaft having defined in it an inner race for bearing elements for axially holding the bearing elements;

an outer race radially outside the inner race;

bearing elements supported between the inner and outer races on the shaft;

the housing being radially outside the outer race and spaced therefrom;

an intermediate sleeve of deformable material disposed between the housing and the outer race; at least one of the housing and the outer race having withdrawal prevention means thereon between the outer race and the intermediate sleeve for preventing the sleeve from separating from between the outer race and the housing;

the sleeve having a generally L-shaped profile in cross-section, such that one leg of the L is inserted between the outer race and the housing and is moved therebetween upon insertion until the other leg of the L contacts the housing for blocking further insertion of the intermediate sleeve between the housing and the outer race.

* * * * *

UNITED STATES PATENT AND TRADEMARK OFFICE
CERTIFICATE OF CORRECTION

PATENT NO. : 4,611,933

DATED : Sep. 16, 1986

INVENTOR(S) : Heinrich Hofmann et al.

It is certified that error appears in the above-identified patent and that said Letters Patent is hereby corrected as shown below:

Title page:

Item [73], change the Assignee's name to read:

--FAG KUGELFISCHER Georg Schafer (KGaA),

Fed. Rep. of Germany --

Signed and Sealed this

Second Day of December, 1986

*Attest:*

DONALD J. QUIGG

*Attesting Officer*       *Commissioner of Patents and Trademarks*